Patented July 17, 1934

1,966,820

UNITED STATES PATENT OFFICE 1,966,820

FERTILIZER AND PROCESS FOR THE PRODUCTION THEREOF

Russell M. Jones, New Brunswick, N. J., assignor to The Barrett Company, New York, N. Y., a corporation of New Jersey No Drawing. Application March 28, 1931, Serial No. 526,115

8 Claims. (Cl. 71—9)

This invention relates to a new fertilizer material and process for producing the same. More particularly, this invention relates to the production of mixed fertilizers comprising urea and potassium chloride.

Urea has long been recognized as a valuable nitrogenous fertilizer. It may be prepared in the form of a divided solid which presents little difficulty attendant upon storing and subsequent distribution in the field. It is frequently desired, however, to prepare fertilizer mixtures containing both nitrogen and potash and for this purpose it as been proposed to mix urea with potassium chloride. In order to prepare a complete fertilizer mixture containing phosphorous salts, nitrogen and potash, it has likewise been proposed to prepare a mixture of urea, potassium chloride and superphosphate. When fertilizer mixtures containing urea and potassium chloride, such as noted above are prepared, however, it has been found that the resulting product is hygroscopic in character and upon storing under the usual conditions rapidly absorbs considerable quantities of moisture from the air and becomes damp and sticky. This characteristic of mixtures containing potassium chloride and urea has been a series disadvantage to their employment as fertilizers. In German Patent 388,469 it was proposed to overcome this undesirable characteristic of these mixtures by adding to a mixture of potassium chloride, superphosphate and urea, a proportion of finely divided calcium carbonate. While the presence of the calcium carbonate exercises some influence upon the hygroscopicity of the resulting mixture, it has been found that the fertilizers thus prepared still exhibit an undesirable hygroscopicity.

It is an object of this invention to provide a new fertilizer comprising urea and potassium chloride which is relatively non-hygroscopic and which may be stored for considerable periods of time without becoming moist by the absorption of water vapor from the atmosphere.

I have discovered that the hygroscopicity of fertilizer mixtures comprising urea and potassium chloride are caused by the presence of impurities in the potassium chloride which has heretofore been employed in the preparation of such mixtures and not by the influence of the potassium chloride itself. I have further discovered that by employing in the preparation of mixed fertilizers containing urea a potassium chloride substantially free from impurities which react with urea to form hygroscopic products, a mixed fertilizer may be prepared which is relatively stable and remains in a dry condition for relatively long periods of time without becoming damp by absorption of water vapor.

In preparing a fertilizer in accordance with this invention, a urea material is admixed with potassium chloride which is substantially free from impurities which react with urea to form hygroscopic properties. In general, commercial potassium chloride, as sold for use in the compounding of fertilizers, contains substantial amounts of impurities such as sodium chloride and/or magnesium chloride. The following table shows the composition of a typical example of a commercial muriate of potash:

| | |
|---|---|
| KCl | 72.5% |
| MgSO$_4$ | 0.8% |
| MgCl$_2$ | 0.6% |
| NaCl | 21.2% |
| Moisture | 2.5% |
| Insoluble | 0.5% |

When such a potassium chloride is admixed with a urea material, the resulting product does not have satisfactory characteristics as a fertilizer since it exhibits a marked tendency to absorb moisture from the air and of becoming damp and sticky. A possible explanation of the influence of impurities contained in commercial potassium chloride upon the physical properties of mixed fertilizers containing it, together with urea, is that the urea forms hygroscopic compounds with the impurities, such as sodium chloride and magnesium chloride. For example, in the case of sodium chloride, a compound of the nature of $CO(NH_2).NaCl.H_2O$ may be formed. This material is hygroscopic and thus imparts this characteristic to the mixture.

The invention accordingly comprises the several steps and the relation of one or more of such steps with respect to each of the others and the product possessing the features, properties and relation and composition of the constituents which are exemplified in the following detailed disclosure and the scope of the invention will be indicated in the claims.

For a fuller understanding of the nature and objects of the invention, reference should be had to the following detailed description of a method for producing a mixed fertilizer in accordance with this invention:

Example 1.—A potassium chloride having the following composition:

| | |
|---|---|
| KCl | 98.5% |
| NaCl | 1.2% | is admixed with urea in the desired proportion. The resulting product is a stable substantially dry fertilizer which may be stored for long periods of time without developing undesirable characteristics.

*Example 2.*—About 20 parts of urea are admixed with 82 parts of dry superphosphate and with about 13 parts of the potassium chloride employed in Example 1 above and the admixture treated with about 3⅓ parts of ammonia as 25% aqua ammonia. If desired, the urea and aqua ammonia may be added simultaneously to the superphosphate and potassium chloride, as for example, by employing a solution of urea in aqua ammonia. Or, ammonia may be added to the superphosphate and the resulting ammoniated superphosphate admixed with the urea and potassium chloride. When prepared in any of the aforesaid manners, the product comprises ammoniated superphosphate, urea and potassium chloride and is satisfactory in character with respect to hygroscopicity for use as a fertilizer.

Since certain changes in carrying out the above process and certain modifications in the composition which embody the invention may be made without departing from its scope, it is intended that all matter contained in the above description shall be interpreted as illustrative and not in a limiting sense. For example, we have found that it is possible to employ a potassium chloride containing somewhat greater amounts of impurities of the type of sodium chloride and/or magnesium chloride, which cause the mixtures containing urea to be hygroscopic, than that given in Example 1 above without the resulting product being unsuitable as a fertilizer. The total amount of these impurities in the potassium chloride, however, should not be greater than about 5% and is preferably not greater than about 1.5%. Triple superphosphate may be employed with ammonia in the preparation of fertilizers in accordance with this invention, as for example, in place of the superphosphate used in Example 2.

I claim:

1. A fertilizer comprising urea and potassium chloride substantially free from impurities which react with urea to form hygroscopic products.

2. A fertilizer comprising urea and potassium chloride substantially free from sodium chloride and magnesium chloride.

3. A process of preparing a fertilizer which comprises admixing a urea material and potassium chloride substantially free from impurities which react with urea to form hygroscopic products.

4. A process of preparing a fertilizer which comprises admixing a urea material and potassium chloride substantially free from sodium chloride and magnesium chloride.

5. A process of preparing a fertilizer which comprises admixing superphosphate, urea, ammonia and potassium chloride substantially free from impurities which react with urea to form hygroscopic products.

6. A process of preparing a fertilizer which comprises admixing superphosphate, ammonia, a urea material and potassium chloride containing not more than 5% of sodium and magnesium chloride in the proportions of about 82 parts of superphosphate, 3⅓ parts of ammonia, 20 parts of urea and 13 parts of potassium chloride.

7. A fertilizer comprising urea and potassium chloride substantially free from impurities which cause said fertilizer to be hygroscopic.

8. A fertilizer comprising ammoniated superphosphate, urea and potassium chloride substantially free from impurities which cause said fertilizer to be hygroscopic.

RUSSELL M. JONES.